United States Patent
Nagasawa et al.

[11] Patent Number: 5,897,159
[45] Date of Patent: Apr. 27, 1999

[54] ROOF STRUCTURE OF VEHICLE

[75] Inventors: Osamu Nagasawa; Atsushi Oko, both of Hino, Japan

[73] Assignee: Hino Jidosha Kogya Kabushiki Kaisha, Tokyo, Japan

[21] Appl. No.: 08/755,956

[22] Filed: Nov. 25, 1996

[30] Foreign Application Priority Data

| Dec. 1, 1995 | [JP] | Japan | 7-314115 |
| Aug. 21, 1996 | [JP] | Japan | 8-219948 |
| Nov. 1, 1996 | [JP] | Japan | 8-291693 |

[51] Int. Cl.$^6$ .................................... B60D 25/06
[52] U.S. Cl. ........................... 296/210; 296/208
[58] Field of Search .................... 296/210, 213, 296/208, 154, 183

[56] References Cited

U.S. PATENT DOCUMENTS

| 4,417,762 | 11/1983 | Imai et al. | 296/210 |
| 4,618,181 | 10/1986 | Tokuda et al. | 296/210 X |
| 4,792,180 | 12/1988 | Jacobsen et al. | 296/210 |

FOREIGN PATENT DOCUMENTS

| 136567 | 8/1983 | Japan | 296/210 |
| 63-61382 | 4/1988 | Japan . | |
| 37082 | 2/1990 | Japan | 296/210 |
| 404078738 | 3/1992 | Japan | 296/210 |
| 405278634 | 10/1993 | Japan | 296/210 |
| 6-53372 | 7/1994 | Japan . | |

*Primary Examiner*—Joseph D. Pape
*Attorney, Agent, or Firm*—Oblon, Spivak, McClelland, Maier & Neustadt, P.C.

[57] ABSTRACT

Provision of abutments on exposed and/or unexposed portions of roof and side outer members at a boundary portion causes the members not to be vertically overlapped to each other at the boundary portion. Therefore, the roof member can be placed on the side outer member from right above with no trouble since the unexposed surface portion of the roof member does not interfere with the exposed and unexposed surface portions of the underlying side outer member.

1 Claim, 17 Drawing Sheets

ROOF STRUCTURE OF VEHICLE

BACKGROUND OF THE INVENTION

The present invention relates to a roof structure of a vehicle.

A roof structure with a drip channel has been prevailingly adopted for a vehicle such as passenger car or bonnet truck.

An example of such roof structure with a drip cannel is shown in FIGS. 14 to 17.

More specifically, for a door opening 2 in a vehicle body 1 as shown in FIG. 14, a drip channel 4 is spot-welded at 5 as shown in FIG. 15 to a side outer member 3 which provides a lateral surface of car cabin. A roof member 6 is placed on the side outer member 3 from right above and is spot-welded at 7 to the drip channel 4.

A pillar 8 as shown in FIG. 14 is provided such that the roof member 6 placed on the side outer member 3 from right above is coupled to the member 3 at 9 by brazing or arc brazing as shown in FIGS. 16 and 17.

In the figures, reference numeral 10 denotes a side inner member.

With the above arrangement, a boundary between the members 6 and 3 are verically coupled together at the pillar 8 so that placement of the member 6 on the member 3 from right above causes no structral problems; however, there are problems in that the drip channel 4 is needed to mount the roof member 6 and that troublesome working such as brazing or arc brazing is required.

For this reason, a roof structure with no drip channel has been proposed and employed in recent years.

In this roof structure with no drip channel, as shown in FIGS. 18 to 21, a boundary 13 between a roof member 11 and a side outer member 12 is at a roof 14. The members 11 and 12 are respectively formed with groove-defining side walls 15 and 17 and groove-defining bottoms 16 and 18. The bottom 16 of the roof member 11 is placed on and spot-welded to the bottom 18 of the side outer member 12 to provide the boundary 13 in the form of a groove 20 substantially extending in a longitudinal direction 19 of the vehicle. The groove 20 is filled with molding (not shown) made of rubber or synthetic resin to hide the boundary 13.

Thus, the use of the roof structure with no drip channel eliminates the need for the drip channel 4 as well as troublesome working such as brazing or arc brazing.

However, the roof structure with no drip channel as described has a below-mentioned disadvantage.

Generally, a vehicle has, on its front and rear sides, windows 21 (particularly, a substantially vertical window on the rear side in the case of a bonnet truck). Accordingly, the members 11 and 12 must be provided at their longitudinal ends with unexposed surface portions 26 and 27 as shown in FIG. 19 which comprise inner bents 22 and 23 for engagement with a pane of glass for the window 21 and lower margins 24 and 25 for support of the glass pane, respectively.

The unexposed surface portions 26 and 27 are inevitably receded relative to exposed surface portions 28 and 29 of the roof 14. Hence, there is a fair possibility that the roof member 11 cannot be placed on the side outer member 12 from right above since the unexposed surface portion 26 of the roof member 11 interferes at 30 with the exposed and unexposed portions 29 and 27 of the member 12.

The present invention was made in view of the above and has its object to provide a roof structure for a vehicle in which a roof member can be placed on a side outer member with no trouble.

In a first aspect, the present invention provides a roof structure for a vehicle which comprises a side outer member and a roof member combined at side portions thereof to provide a groove extending over at least midway of a boundary between said members, said groove being defined by overlapped portions of said members, boundary portion on at least either of front and back ends of the members being provided by abutments on said members which are not overlapped to each other.

In a second aspect, the present invention provides a roof structure for a vehicle which comprises a side outer member and a roof member combined at side portions thereof to provide a groove extending over at least midway of a boundary between said members, said groove being defined by overlapped portions of said members, the side portion of the roof member being diagonally cut out to provide a diagonally cut portion downwardly directed toward the center axis of the roof member such that a corner defined by the cut portion and exposed and unexposed surface portions of the roof member is substantially aligned with a corner defined by the exposed and unexposed surface portions of the side outer member, said unexposed surface portions of said members having abutments which are not overlapped to each other.

In a third aspect, the present invention provides a roof structure for vehicle which comprises a side outer member and a roof member combined at side portions thereof to provide a groove extending over a boundary between said members, parts of an inner bent and a lower margin constituting an unexposed surface portion of the roof member being cut out to provide a cut-out such that in use a lower edge of said cut-out is spaced apart from an edge of a groove-defining portion of the side outer member toward a center axis of the vehicle, an inner bent and a lower margin constituting an unexposed surface portion of the outer side member being extended to provide an extension toward the center axis of the vehicle, said inner bents and said lower margins of said unexposed surface portions of said members being mutually overlapped with those of said roof members being inside.

In the above-mentioned first aspect, provision of the abutments on the exposed and/or unexposed portions of the members at the boundary portion causes the members not to be vertically overlapped to each other at the boundary portion. Hence, the roof member can be placed on the side outer member from right above with no trouble since the unexposed surface portion of the roof member does not interfere with the exposed and unexposed surface portions of the underlying side outer member.

In the above-mentioned second aspect, the unexposed portion of the roof member is not vertically overlapped with the exposed and unexposed surface portions of the side outer member since a diagonally cut portion downwardly directed toward the center axis of the roof member is provided such that the corner defined by the cut portion and the exposed and unexposed surface portions of the roof member is substantially aligned with the corner defined by the exposed and unexposed surface portions of the side outer member, said unexposed surface portions of the members having the abutments which are not overlapped to each other and can be abutted to each other in a widthwise direction. This enables the roof member to be placed on the side outer member from right above without any trouble since the unexposed portion of the roof member does not interfere with the exposed and unexposed portions of the underlying side outer member.

In the above-mentioned third aspect, the roof member can be placed on the side outer member without any trouble since the unexposed portion of the roof member does not interfere with the underlying side outer member. This is due to the fact that parts of the inner bent and the lower margin constituting the unexposed portion of the roof member is cut out to provide the cut-out such that in use the lower edge of said cut-out is spaced apart from the edge of the groove-defining portion of the side outer member toward the center axis of the vehicle, the inner bent and the lower margin constituting the unexposed portion of the outer side member being extended to provide the extension toward the center axis of the vehicle, said inner bents and said lower margins of said unexposed surface portions of said members being mutually overlapped with those of said roof members being inside. No putty sealer or the like is needed to apply since there is no gap between the unexposed surface portions of the roof and side outer members.

Preferred embodiments of the present invention will be described in conjunction with the drawings.

DETAILED DESCRIPTION OF THE PREFERRED EMBODIMENTS

Figure 1:
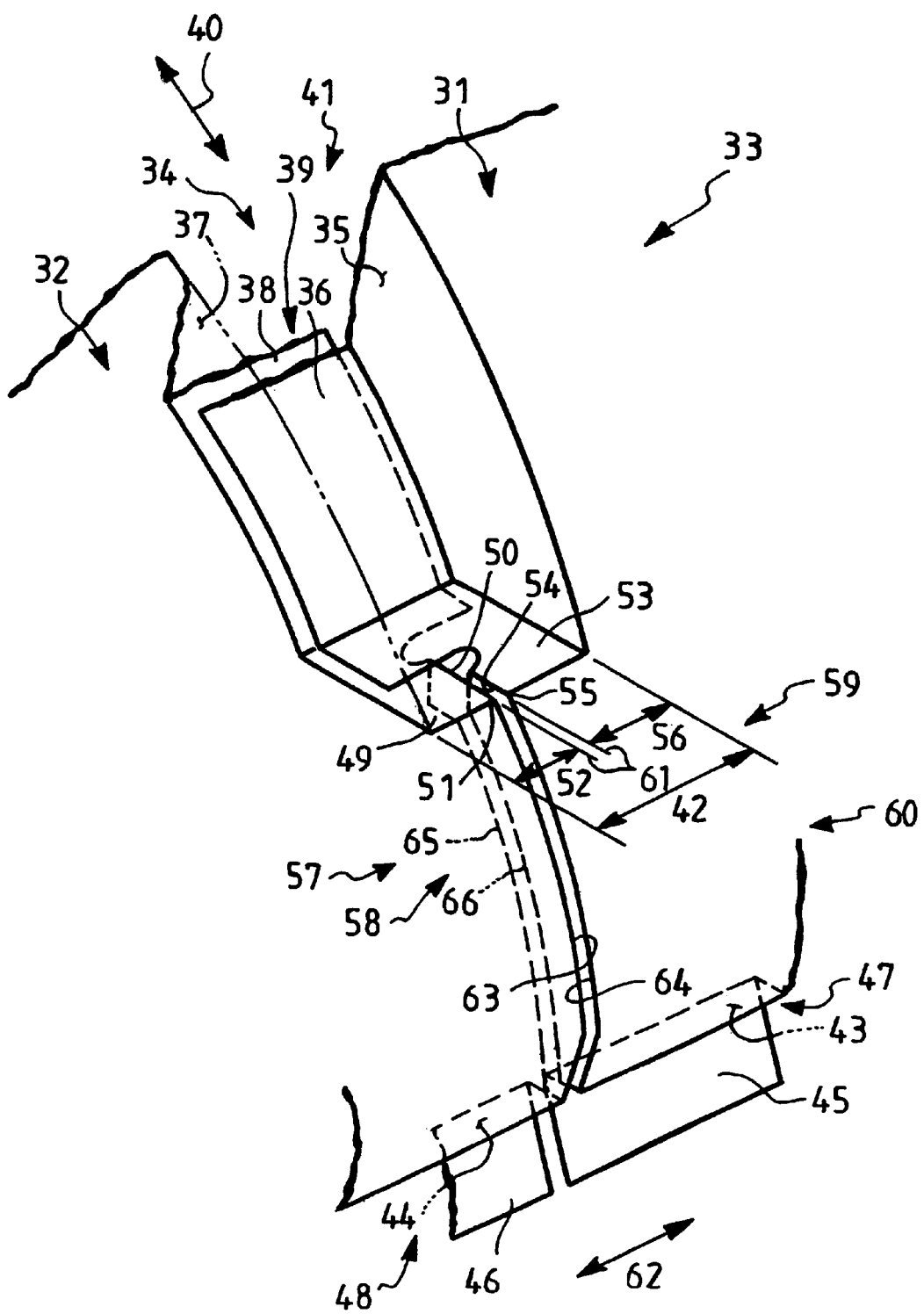
FIG. 1 is a partially enlarged perspective view of a first embodiment of the present invention.
Figure 2:
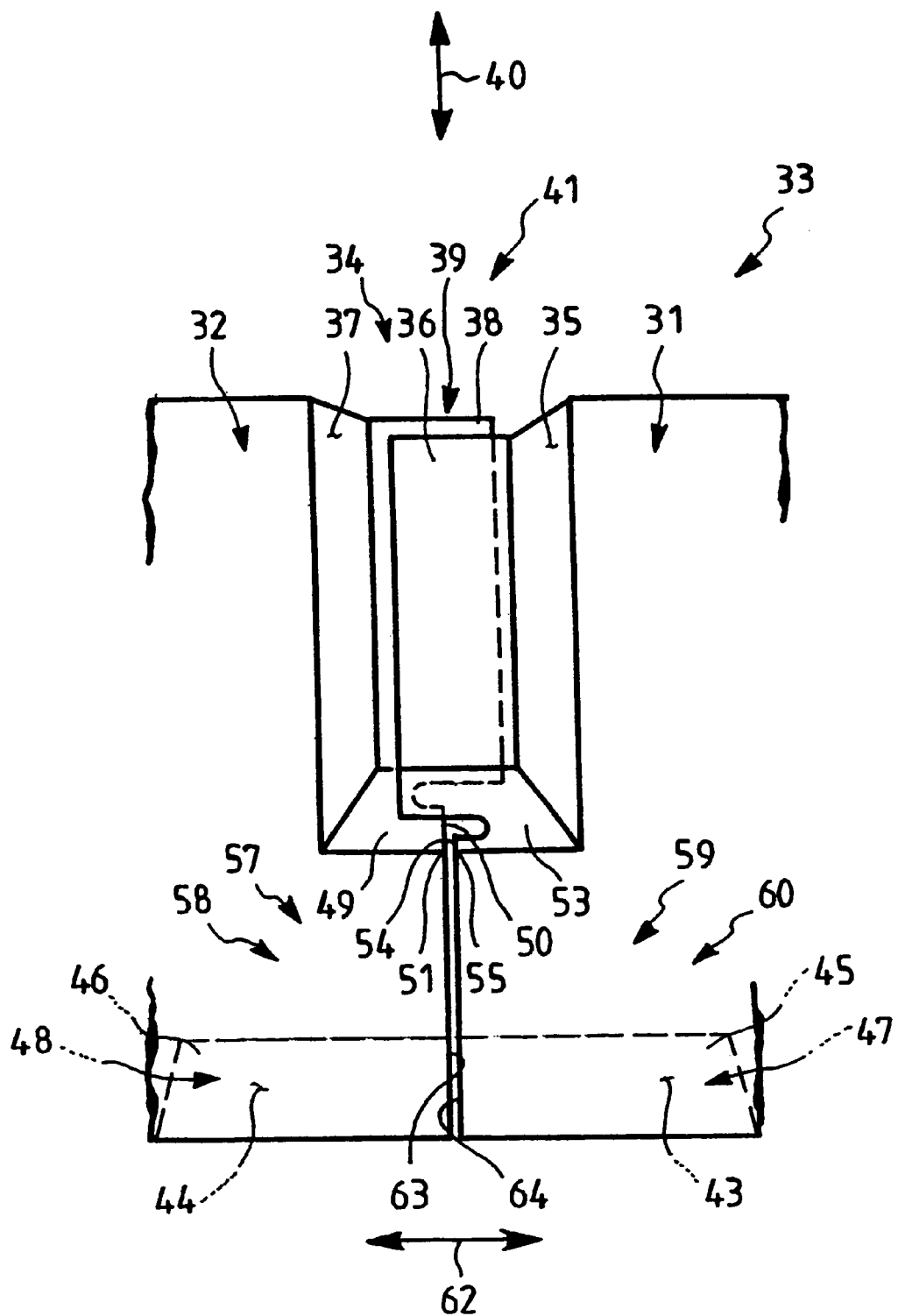
FIG. 2 is a plan view of the embodiment shown in FIG. 1.

FIGS. 1 and 2 represent a first embodiment of the present invention.

In a vehicle such as passenger car or bonnet truck, a boundary 34 between a roof member 31 and a side outer member 32 is at a roof 33. The members 31 and 32 are respectively formed at their side portions with groove-defining side walls 35 and 37 and bottoms 36 and 38 each of which extend over majority of length of the corresponding member except for a longitudinal (front and/or rear) end or ends of the same. The bottom 36 of the roof member 31 is placed on and spot-welded to the bottom 38 of the side outer member 32 at 39 to thereby provide the boundary 34 in the form of a groove 41 extending over majority of length of the members 31 and 32 in a longitudinal direction 40 of the vehicle except for the longitudinal (front and/or rear) end or ends of the members 31 and 32. The groove 41 is filled with molding (not shown) made of rubber or synthetic resin. Thus, the roof structure with no drip channel is provided. Each of the bottoms 36 and 38 has substantially the same width 42 as that of the groove 41 throughout the length of the bottom.

The members 31 and 32 are respectively provided at each of their longitudinal (front and rear) ends with unexposed surface portions 47 and 48 which comprise inner bents 43 and 44 for engagement with a pane of glass for a window (a windshield or a rear window) and lower margins 45 and 46 for support of the glass pane.

In this embodiment, the side outer member 32 is formed, at its groove-defining end wall 49, with a reduced width portion 50 such that width 52 of the end wall 49 at its outer edge 51 is substantially one-half of width 42 of the groove 41; and the roof member 31 is formed, at its groove-defining end wall 53, with a reduced width portion 54 such that width 56 of the end wall 53 at its outer edge 55 is equal to a difference between the width 42 of the groove 41 and the width 52 of the end wall 49 at its outer edge 51. (In FIG. 1, the widths 52 and 56 are shown apart only for facilitation in drawing.)

Further, an abutment 63 is provided by the exposed and/or unexposed surface portions 58 and/or 48 on a portion 57 at the end of the side outer member 32 where no grooved boundary is present; and an abutment 64 is provided by the exposed and/or unexposed surface portion 60 and/or 47 on a portion 59 at the end of the roof member 31 where no grooved boundary is present. These abutments 63 and 64 extends substantially in a longitudinal direction 40 of the vehicle and can be abutted to each other in a widthwise direction 62 substantially at a center 61 of the width 42 of the groove 41.

Reference numerals 65 and 66 respectively denote flanges on the abutments 63 and 64 which can be abutted to each other.

According to this embodiment, the abutment 63 is provided by the exposed and/or unexposed surface portions 58 and/or 48 on the ungrooved portion 57 of the side outer member 32; and the abutment 64 is provided by the exposed and/or unexposed surface portion 60 and/or 47 on the ungrooved portion 59 of the roof member 31. These abutments 63 and 64 can be abutted to each other in the widthwise direction 62 substantially at the center 61 of the width 42 of the groove 41. Hence, the roof member 31 can be placed on the side outer member 32 from right above without any trouble since the unexposed surface portion 47 of the roof member 31 does not interfere with the underlying exposed and unexposed portions 58 and 48 of the side outer member 32.

Figure 3:
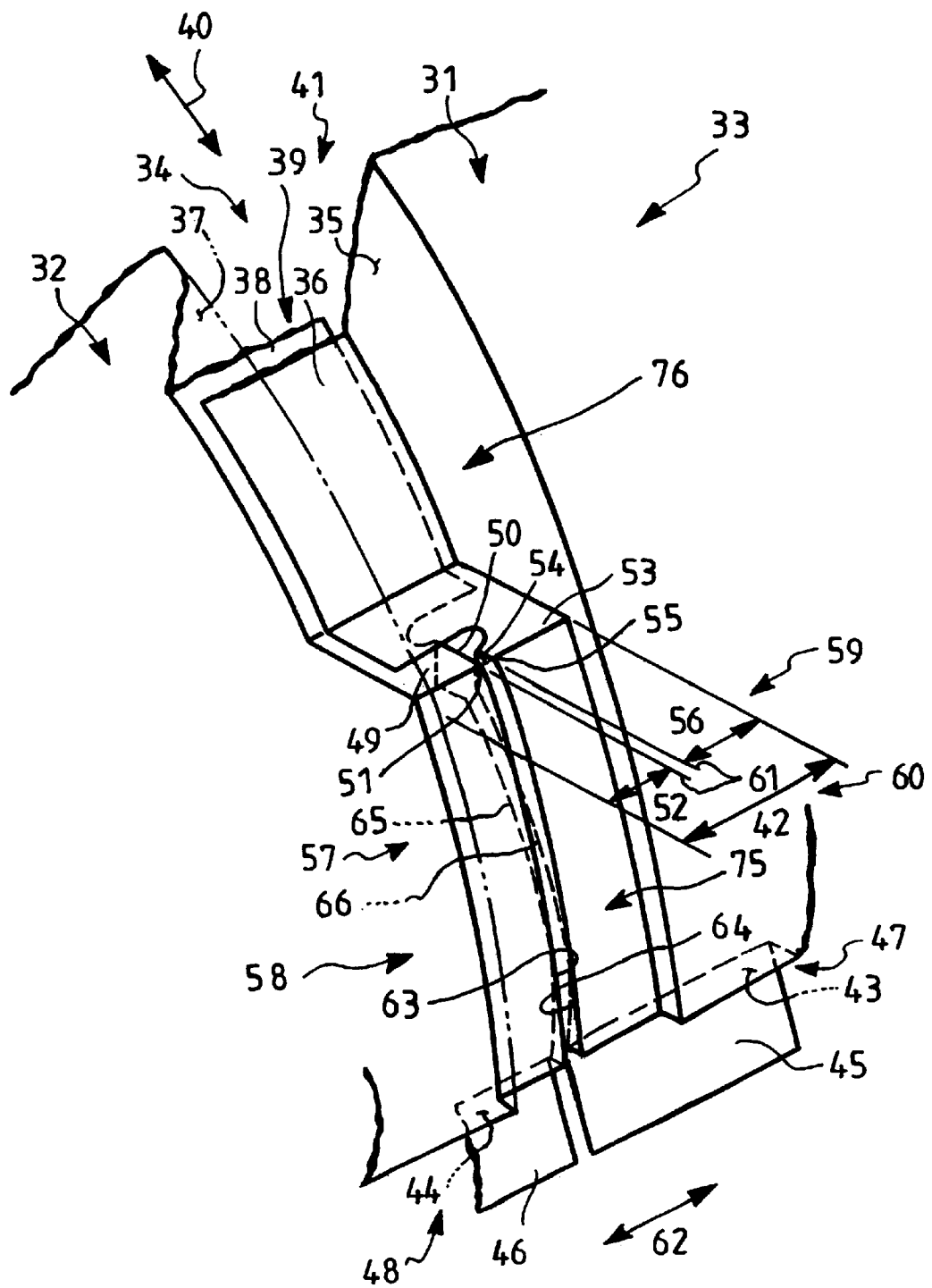
FIG. 3 is a partially enlarged perspective view showing a variation of the first embodiment.
Figure 4:
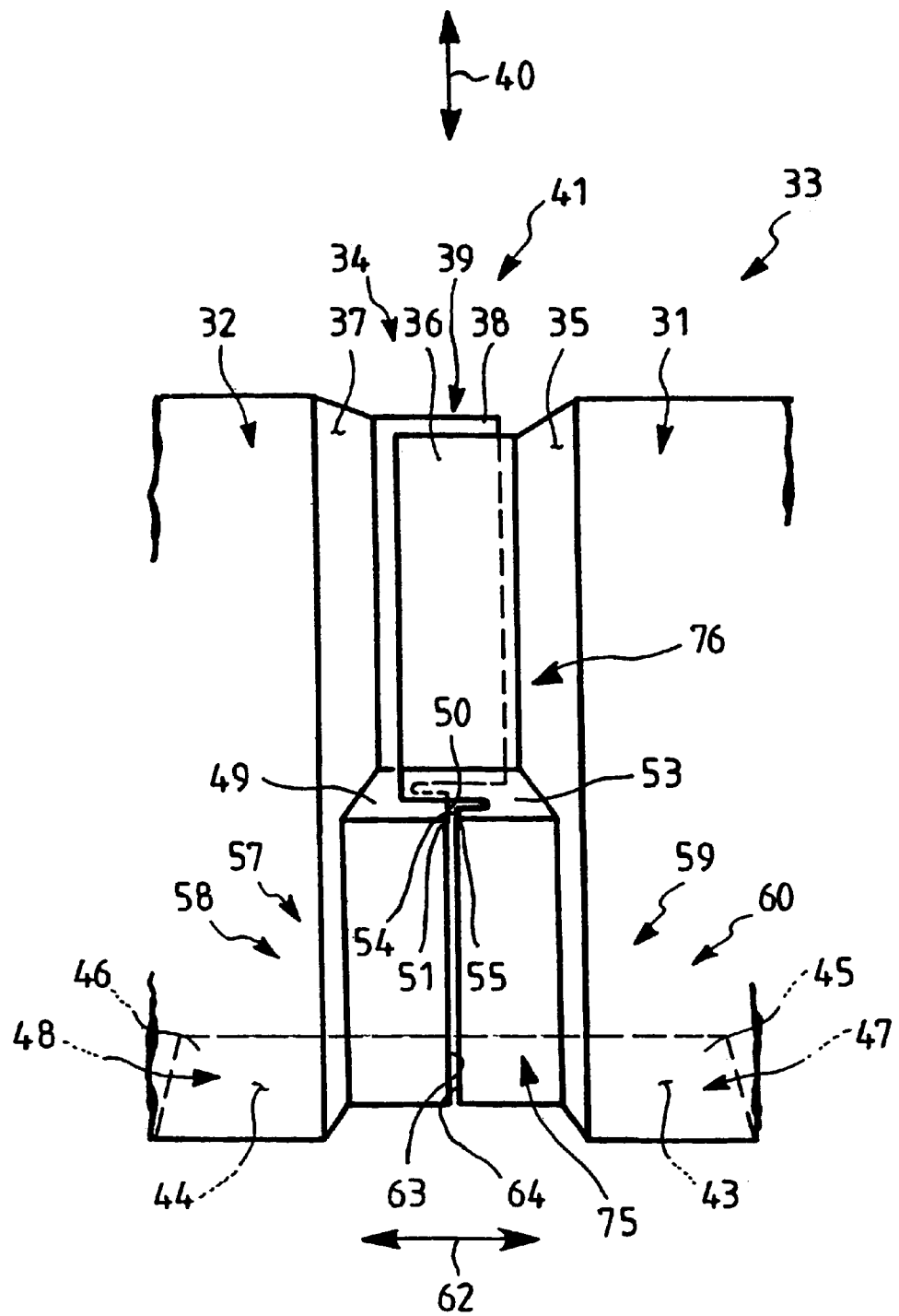
FIG. 4 is a plan view of the variation shown in FIG. 3.

FIGS. 3 and 4 represent a variation of the first embodiment in which the members 31 and 32 are stepped at their portions 59 and 57 including the abutments 64 and 63 to provide a sub-groove 75 continuous to the groove 41. Thus, a groove 76 is constituted as a whole by the grooves 41 and 75.

The sub-groove 75 may be shallower than the groove 41 or may be as deep as the latter. Anyway, the boundary is provided also at one or both longitudinal ends of the members 32 and 31 by the abutments 63 and 64 not overlapping to each other.

Further, the presence of the sub-groove 75 also enables the boundary 34 between the members 31 and 32 to be filled with molding throughout the length of the members 31 and 32.

Figure 5:
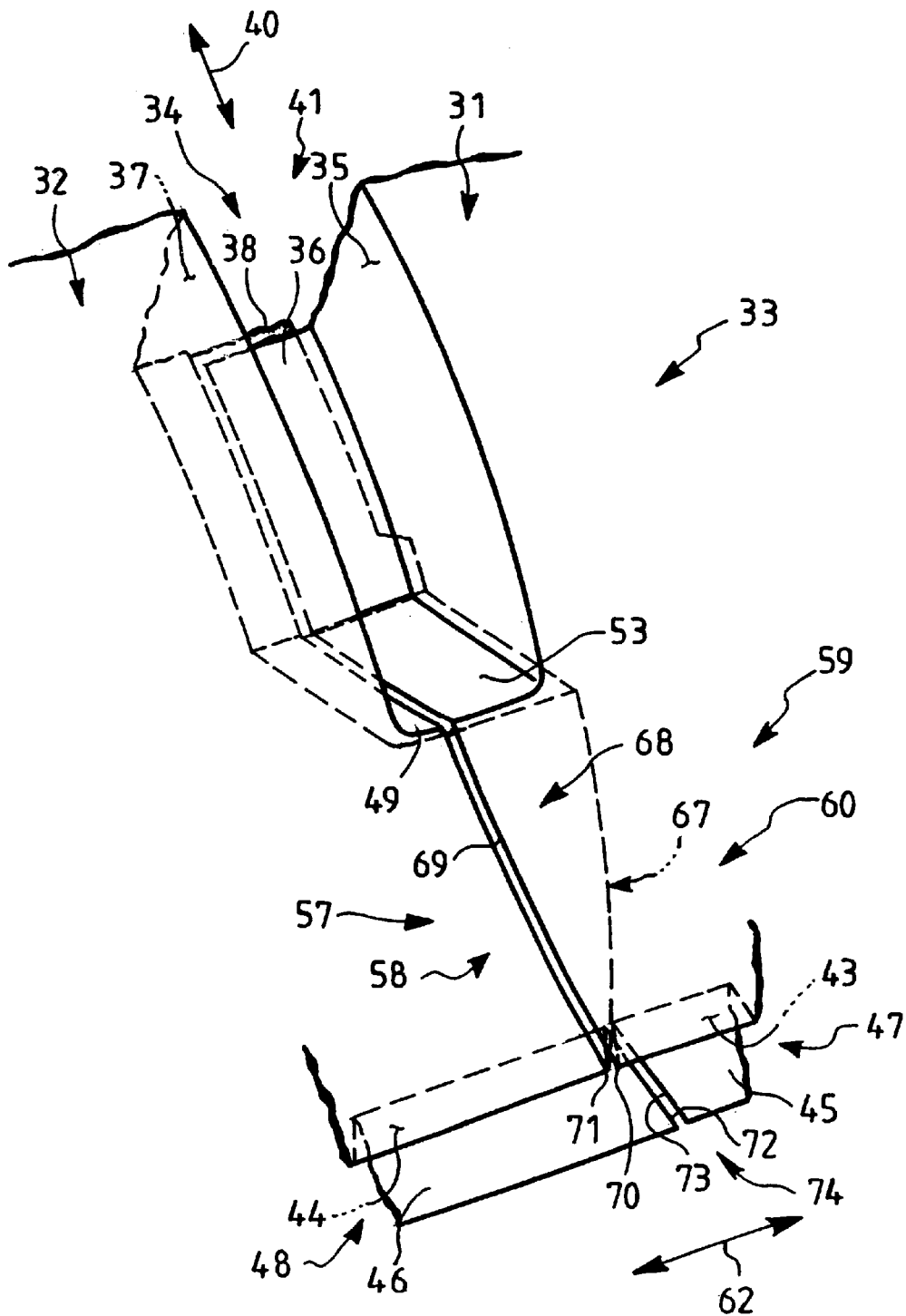
FIG. 5 is a partially enlarged perspective view of a second embodiment of the present invention.
Figure 6:
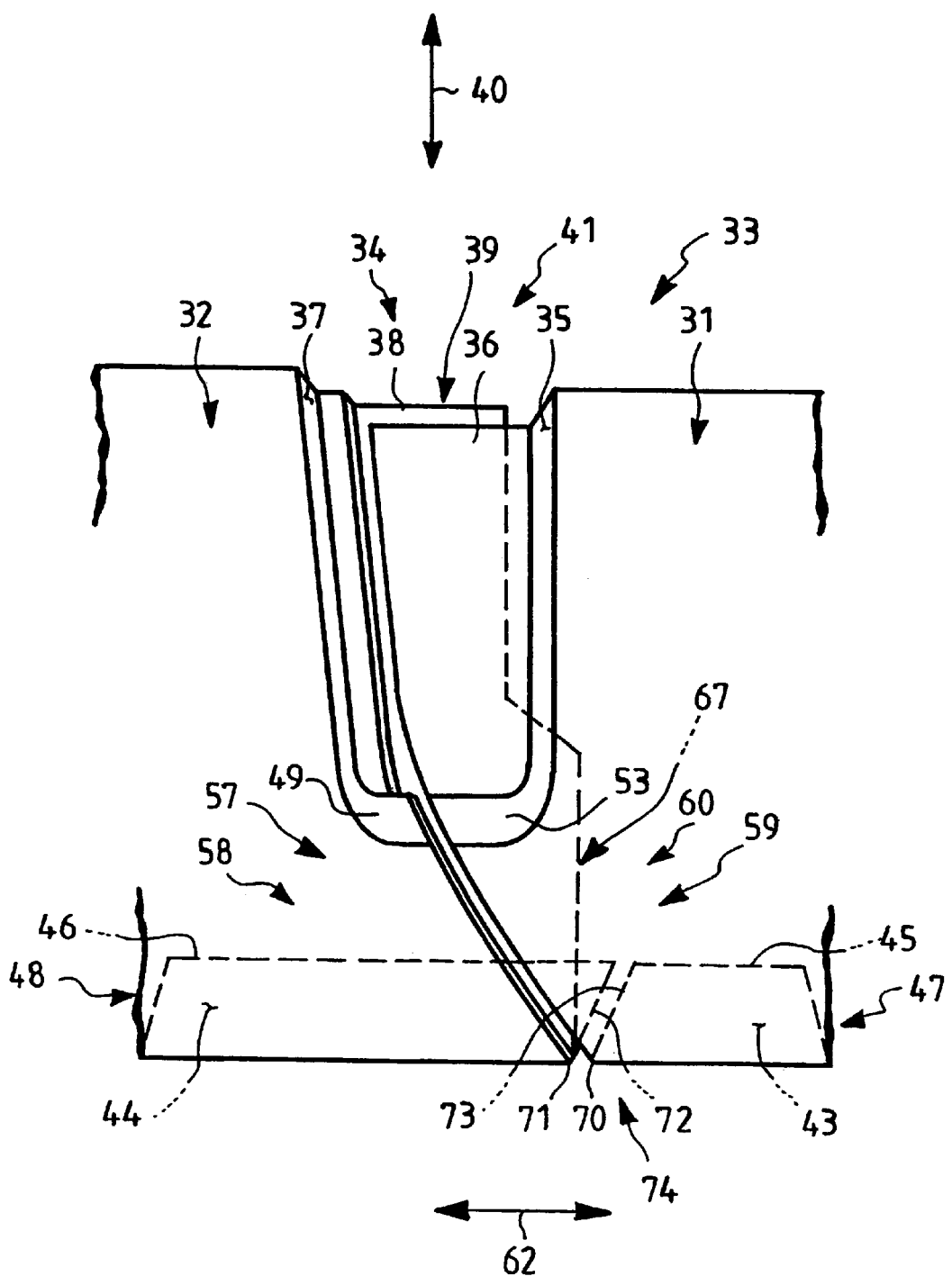
FIG. 6 is a plan view of the second embodiment shown in FIG. 5.

FIGS. 5 and 6 represent a second embodiment of the present invention.

In this embodiment, overlapped portions 67 and 68 of the side outer and roof members 32 and 31 are respectively provided by the groove-defining portions 37, 38, 35 and 36 and the ungrooved end portions 57 and 59 of the members 32 and 31.

The overlying overlapped portion 68 is diagonally cut out at its portion 59 to provide a diagonally cut portion 69 downwardly directed toward the center axis of the roof 33 and thus that of the roof member 31 such that a corner 70 defined by the cut portion 69 and the exposed and unexposed portions 60 and 47 of the member 31 is substantially aligned with a corner 71 defined by the exposed and unexposed surface portions 58 and 48 of the underlying overlapped portion 67 of the side outer member 32.

Figure 8:
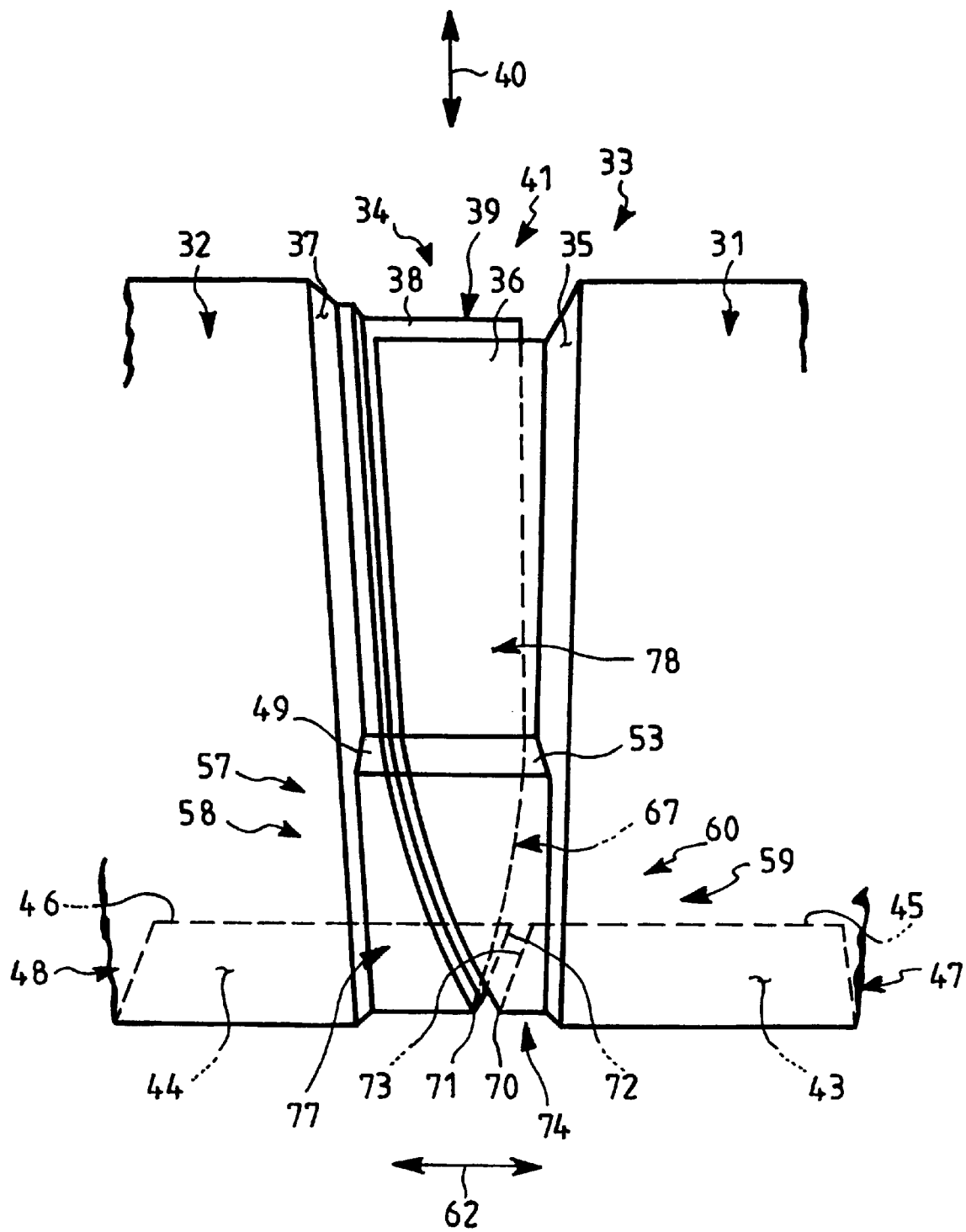
FIG. 8 is a plan view of the variation shown in FIG. 7.
Figure 9:
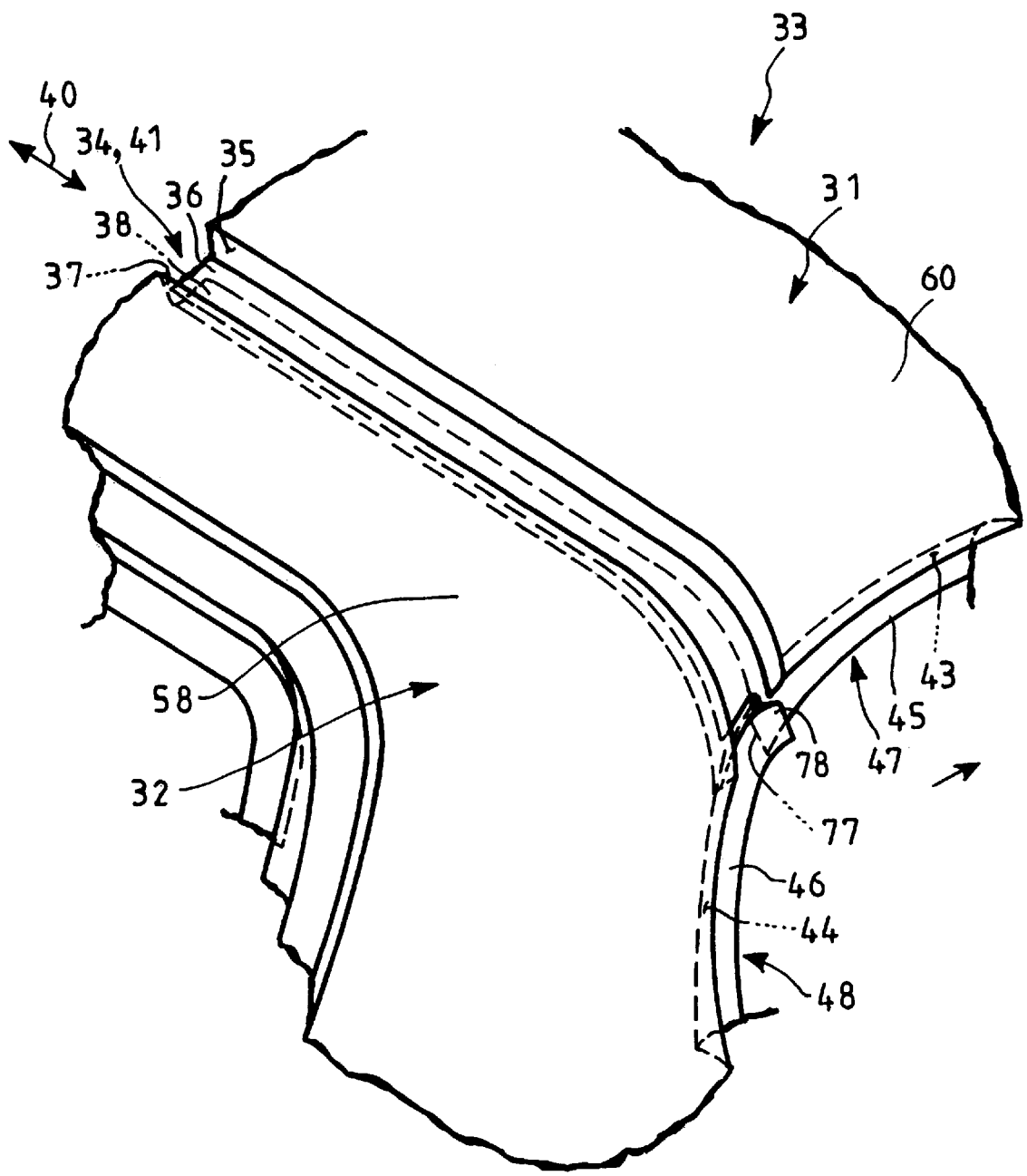
FIG. 9 is a partially enlarged perspective view of a third embodiment of the present invention.
Figure 10:
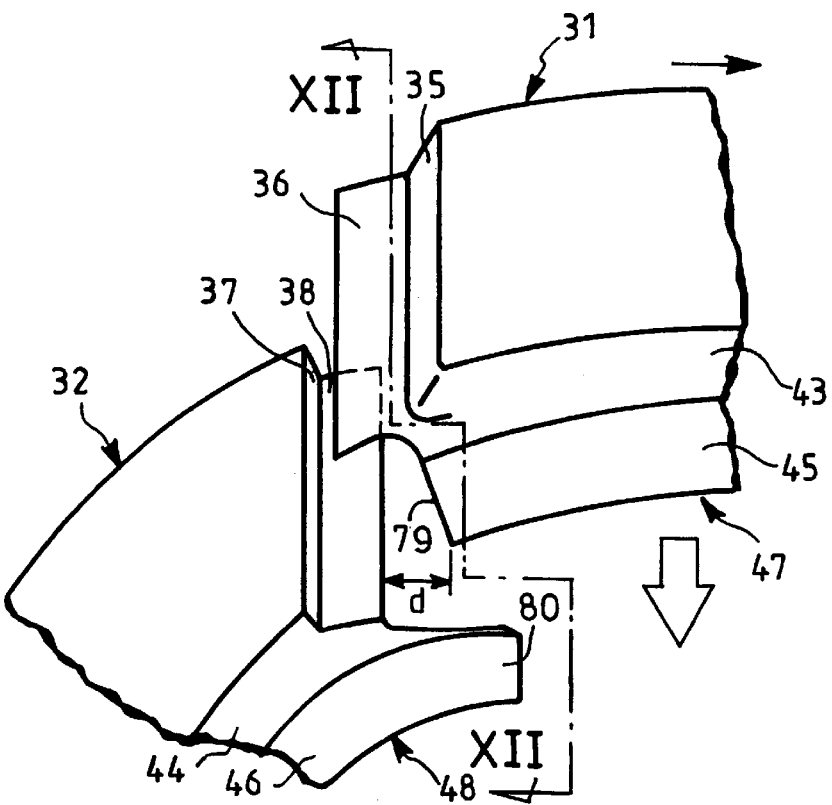
FIG. 10 is a rear view of a part of the third embodiment where the roof member is about to be placed on the side outer member.
Figure 11:
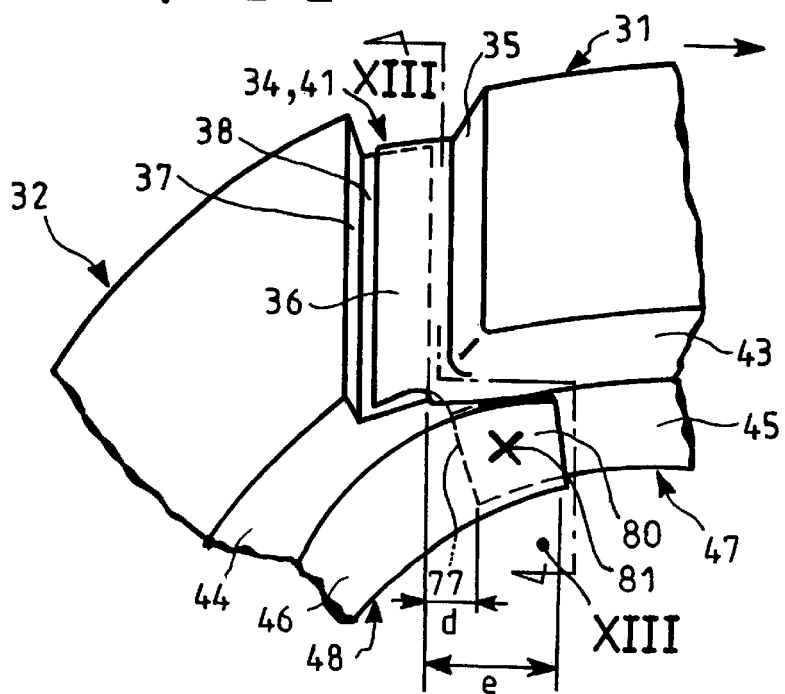
FIG. 11 is a rear view of a part of the third embodiment of the invention after the roof member has been placed on the side outer member.
Figure 12:
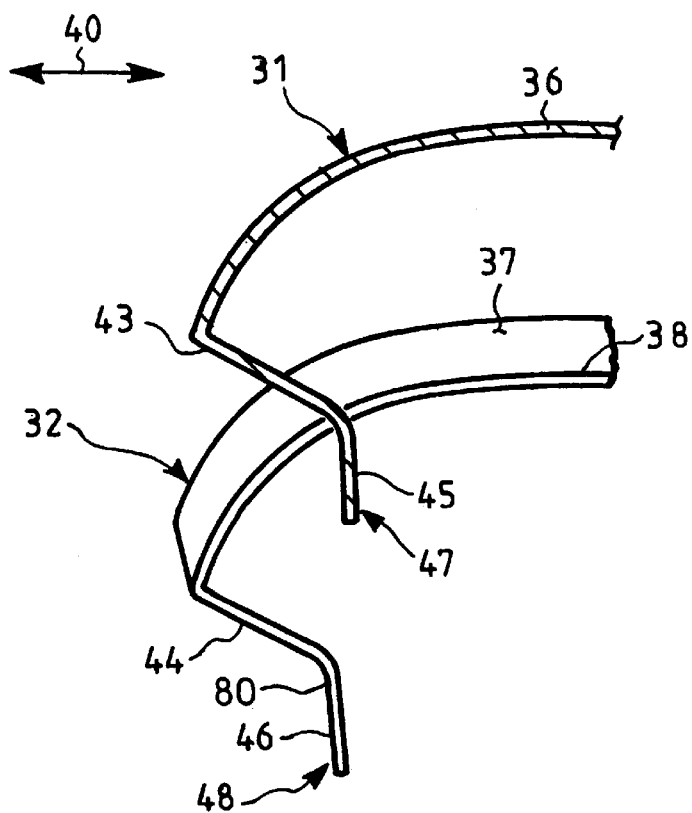
FIG. 12 is a view taken along the line XII—XII in FIG. 10.
Figure 13:
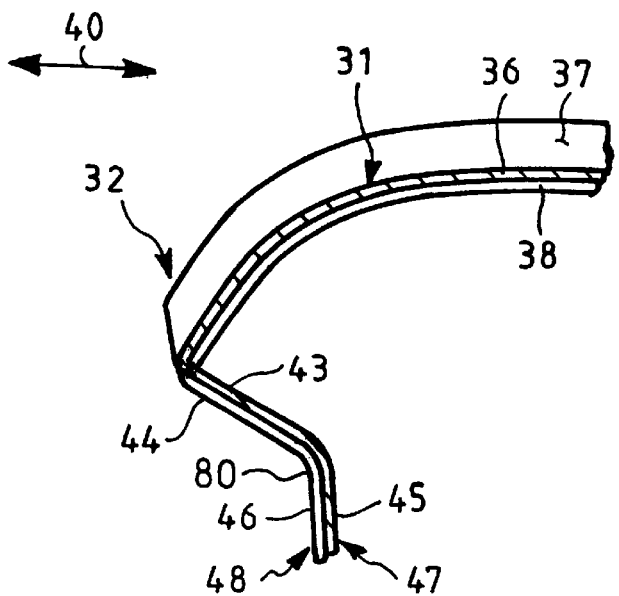
FIG. 13 is a view taken along the line XIII—XIII in FIG. 11.
Figure 14:
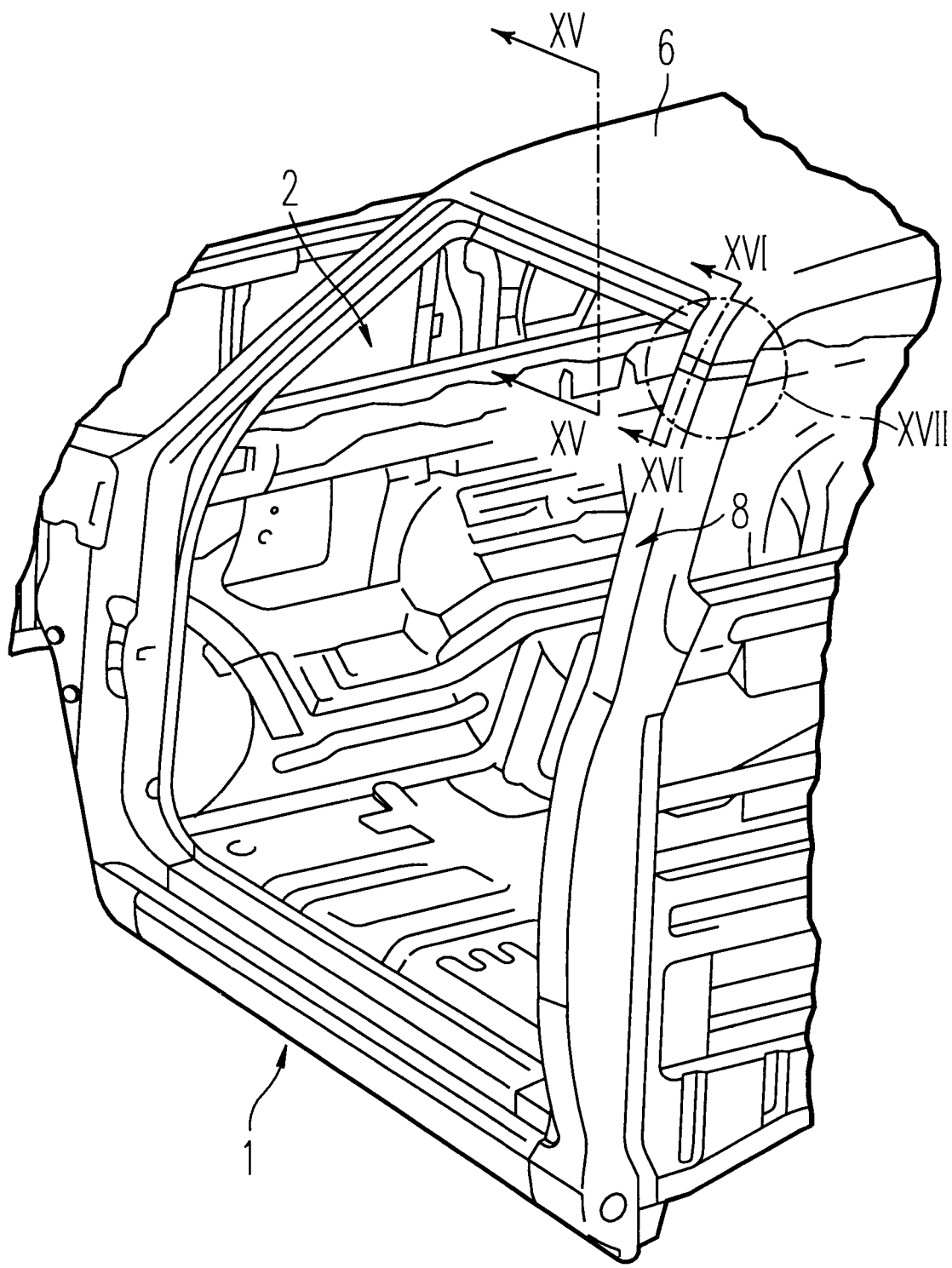
FIG. 14 is a partial perspective view of a vehicle body having a conventional roof structure with a drip channel.
Figure 15:
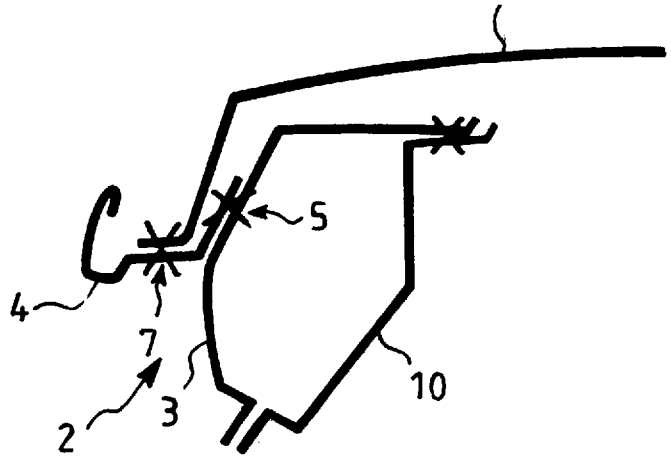
FIG. 15 is a view taken along the line XV—XV in FIG. 14.
Figure 16:
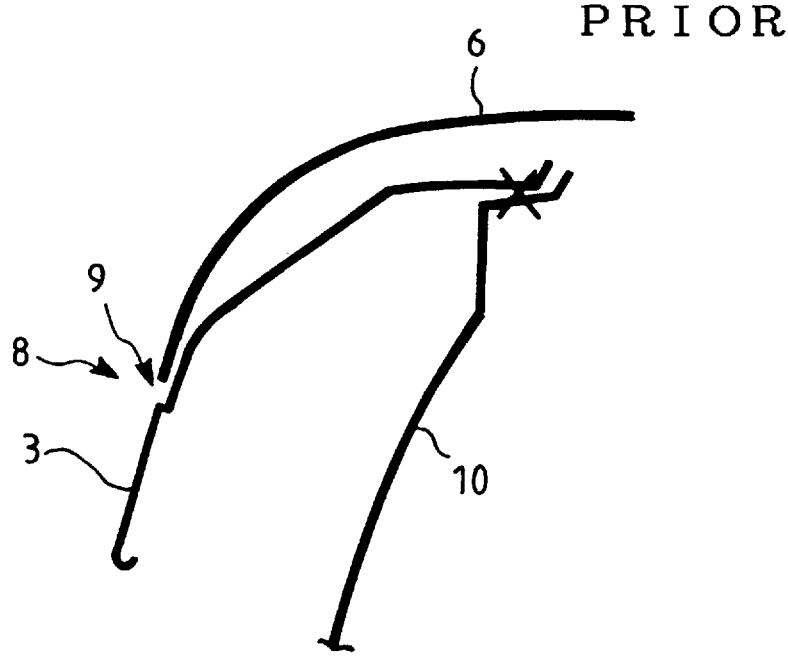
FIG. 16 is a view taken along the line XVI—XVI in FIG. 14.
Figure 17:
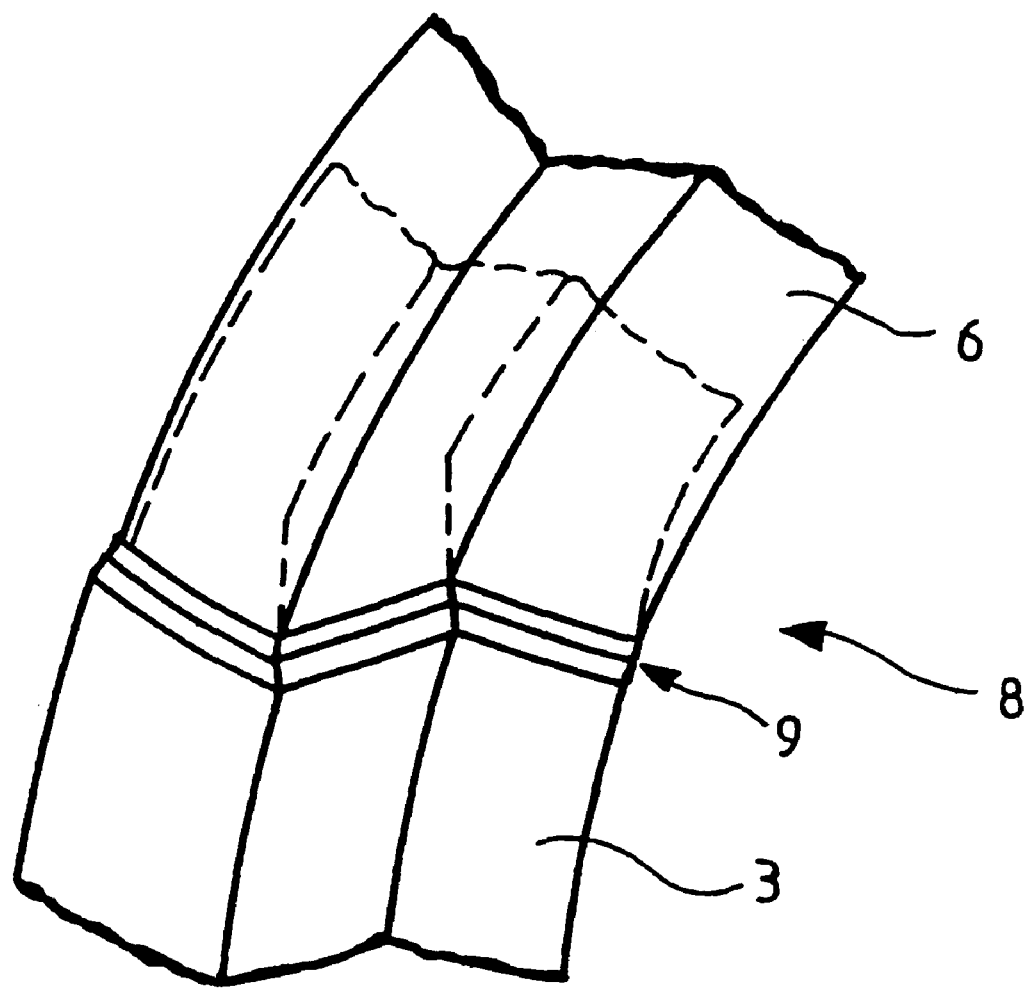
FIG. 17 is an enlarged view of a portion XVII in FIG. 14.
Figure 18:
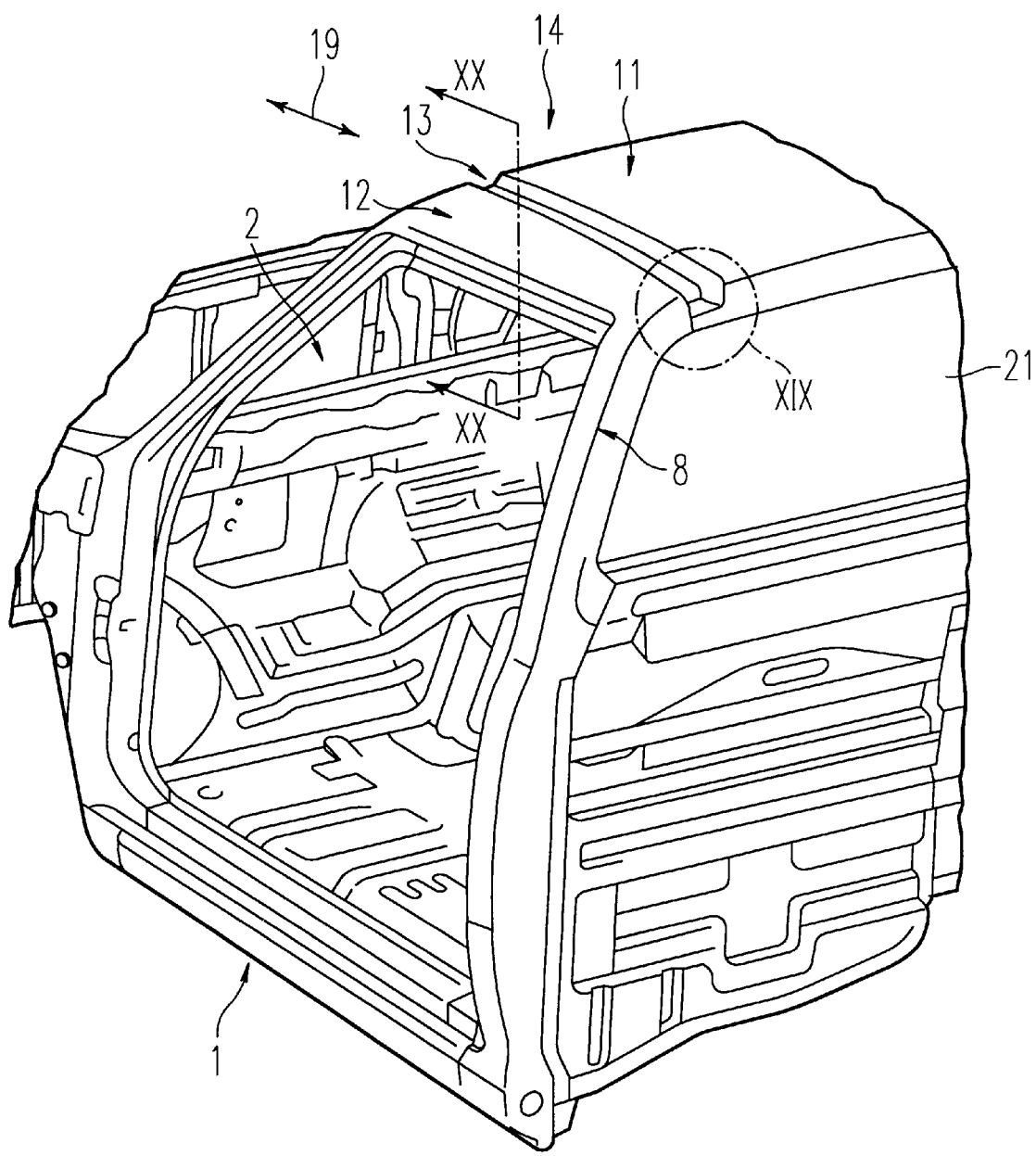
FIG. 18 is a partial perspective view of a vehicle body having a conventional roof structure with no drip channel.
Figure 19:
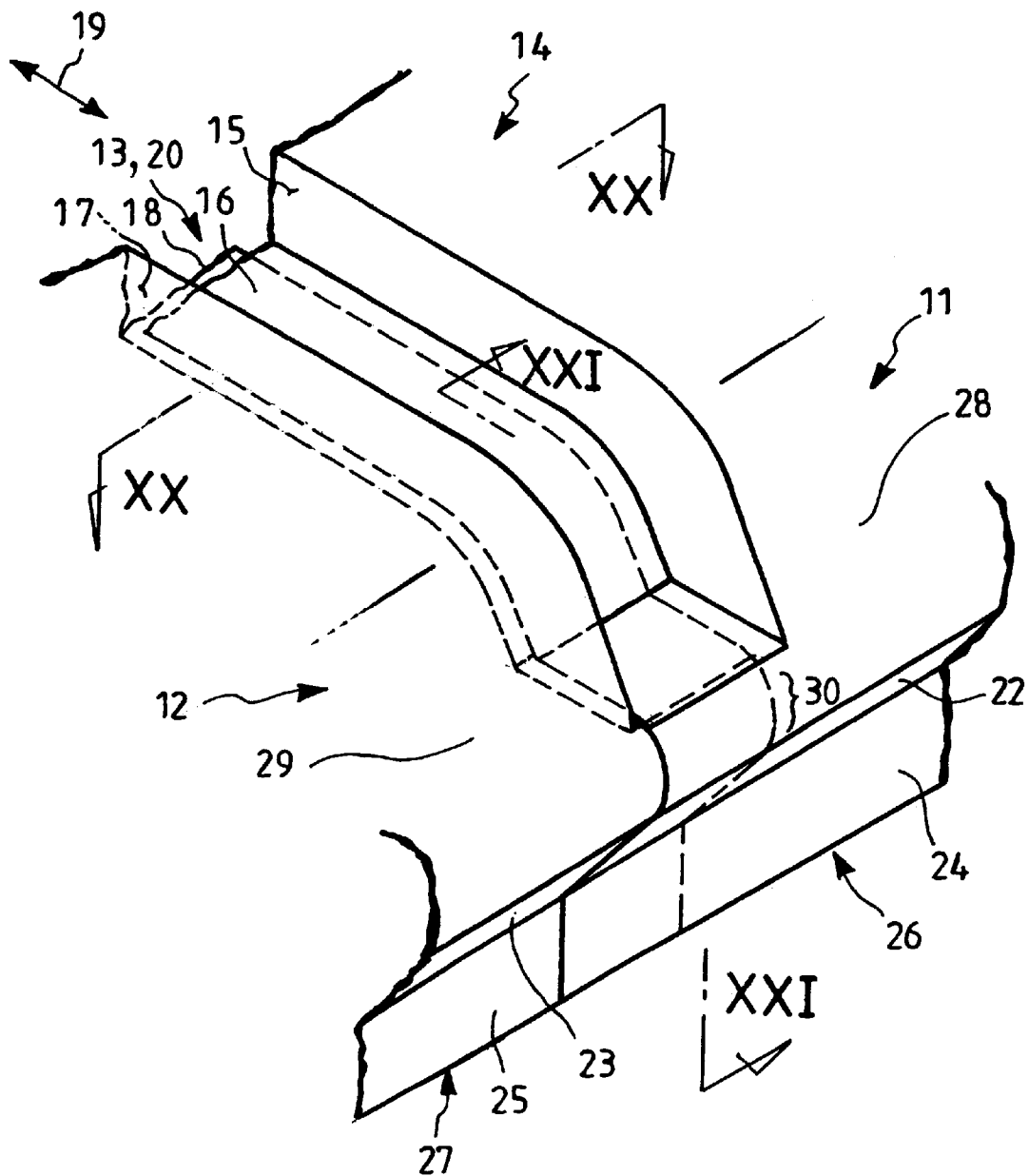
FIG. 19 is an enlarged view of a portion XIX in FIG. 18.
Figure 20:
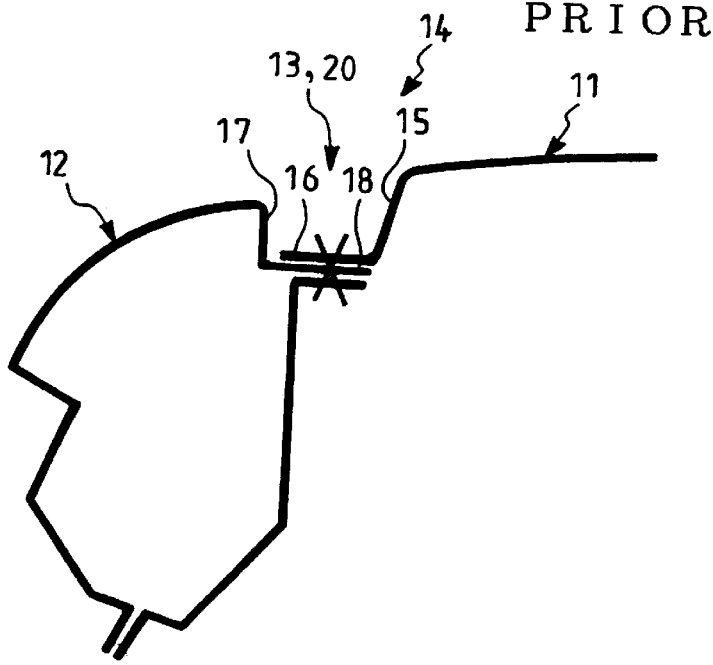
FIG. 20 is a view taken along the line XX—XX in FIGS. 18 and 19.
Figure 21:
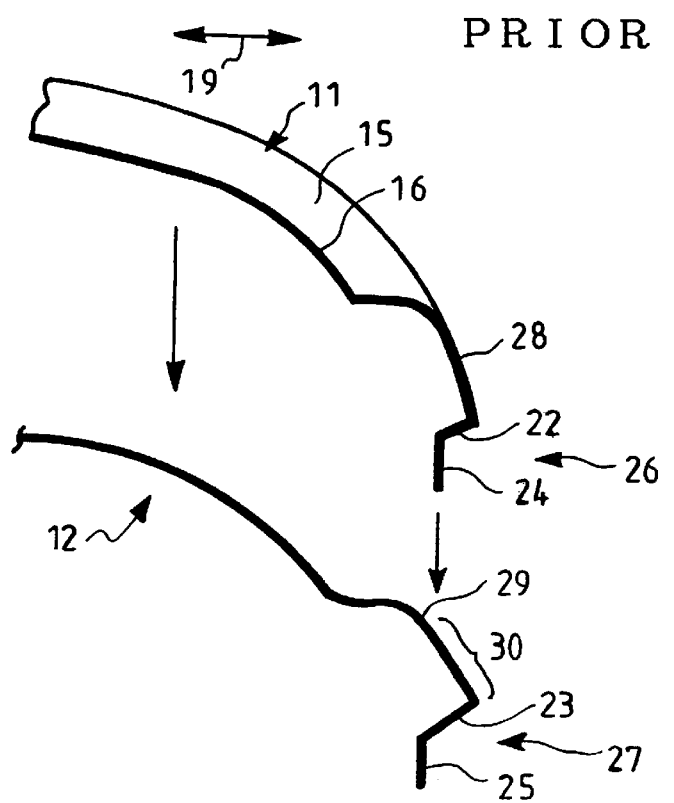
FIG. 21 is a view taken along the line XXI—XXI in FIG. 19.

The underlying portion 67 shown in FIG. 5 is not cut out as in the case of the FIG. 19 prior art; however, the portion 67 may be diagonally cut out to provide a diagonally cut portion 74 directed away from the center axis of the roof 33 such that the corner 70 of the overlying portion 68 is aligned with the corner 71 defined by said diagonally cut portion and the portions 58 and 48 of the underlying portion 67 (In this connection, see FIG. 8).

The unexposed surface portions 48 and 47 of the members 32 and 31 respectively provide abutments 72 and 73 which extend substantially in the longitudinal direction 40 of the vehicle and can be abutted to each other in the widthwise direction 62.

If necessary, the abutments 72 and 73 may be designed in inclined shape as shown at 74 downwardly directed toward the center axis of the roof 33 so that they may be directed away from the exposed surface portion 58 of the side outer member 32.

According to this embodiment, the roof member 31 can be placed on the side outer member 32 from right above without any trouble since the unexposed surface portion 47 of the member 31 is not vertically overlapped with and does not interfere with the exposed and unexposed portions 58 and 48 of the side outer member 32. This is due to the facts that the overlying overlapped portion 68 is diagonally cut out at its portion 59 to provide the diagonally cut portion 69 downwardly directed toward the center axis of the roof 33 and thus that of the roof member 31 such that the corner 70 defined by the cut portion 69 and the exposed and unexposed portions 60 and 47 of the member 31 is substantially aligned with the corner 71 defined by the exposed and unexposed surface portions 58 and 48 of the underlying overlapped portion 67 of the side outer member 32. The unexposed surface portions 48 and 47 of the members 32 and 31 respectively provide the abutments 72 and 73 which can be abutted to each other in the widthwise direction 62.

In the above-mentioned first embodiment, care is to be taken on sealing against water or the like at the ungrooved and mutually abutted portions 57 and 59 and also on any difference in level between the exposed surface portions 58 and 60 whereas no care is needed in the second embodiment on sealing performance and any difference in height since the overlapped portions 67 and 68 are provided.

Figure 7:
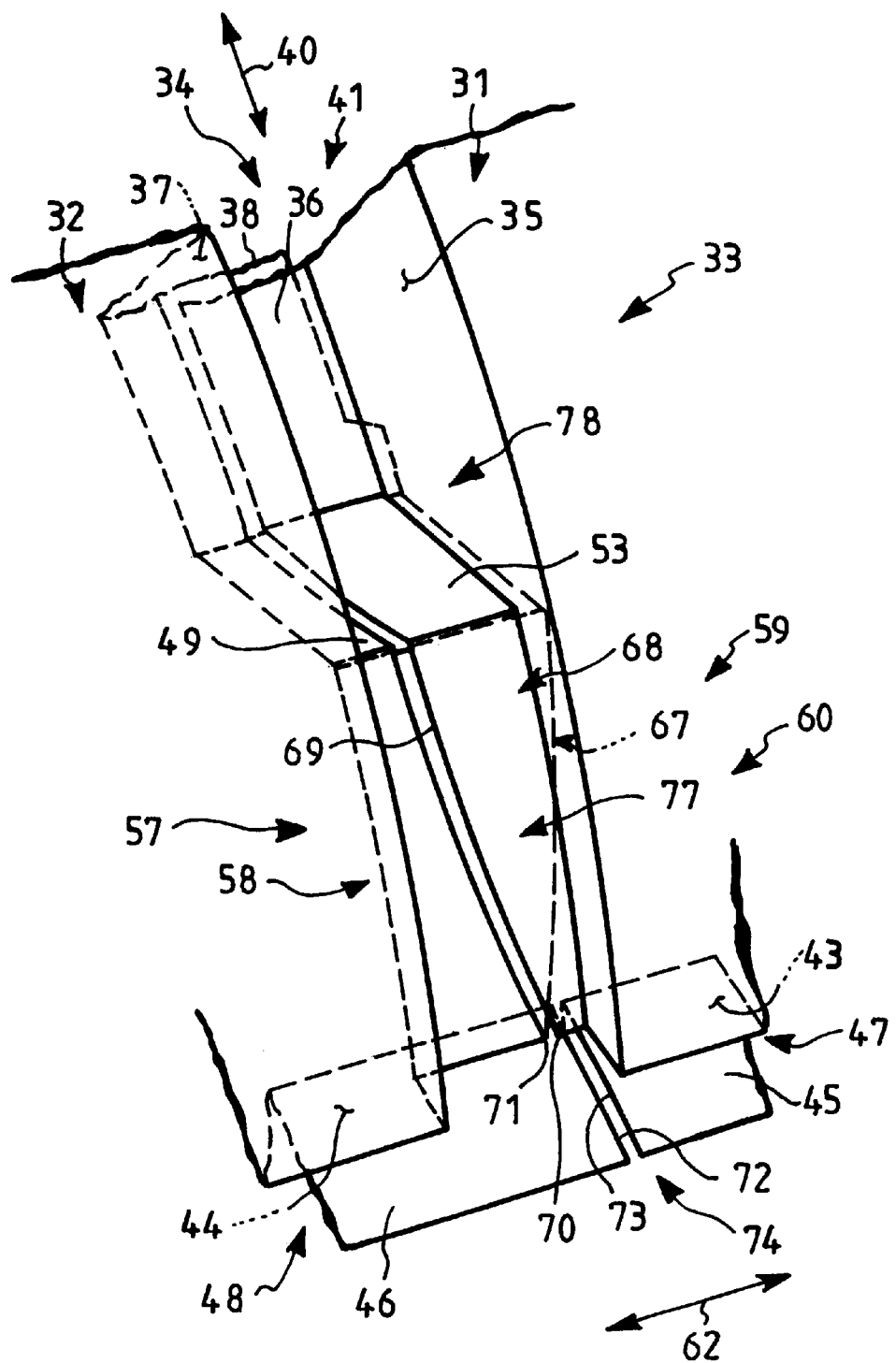
FIG. 7 is a partially enlarged perspective view of a variation of the second embodiment.

FIGS. 7 and 8 represent a variation of the second embodiment in which the members 31 and 32 are stepped at parts of their overlapped portions 68 and 67 including the portions 59 and 58 to thereby provide a sub-groove 77 continuous to the groove 41. Thus, a groove 78 is constituted as a whole by the grooves 41 and 77.

The sub-groove 77 may be shallower than the groove 41 or may be as deep as the latter.

Further, the presence of the sub-groove 77 also enables the boundary 34 between the members 31 and 32 to be filled with molding throughout the length of the members 31 and 32.

FIGS. 9 to 13 represent a third embodiment of the present invention.

In this embodiment, the inner bent 43 and the lower margin 45 of the unexposed surface portion 47 of the roof member 31 are partly cut away to provide a cut-out 79 such that, in use, a lower edge of the cut-off 79 is spaced from the bottom 38 of the member 32 toward the center axis of the vehicle by d as shown. The inner bent 44 and the lower margin 46 of the unexposed surface portion 48 of the side outer member 32 are extended to have an extension 80 spaced at its extended edge from the bottom 38 toward the center axis of the vehicle by e as shown, which in use is combined with the cut-out 79 of the roof member 31 to be placed outwardly on and coupled to the portion 47 of the member 31 for example by spot welding.

According to this embodiment, the roof member 31 can be placed onto the side outer member 32 from right above without any trouble since the unexposed surface portion 47 of the member 31 does not interfere with the underlying member 32. This is due to the facts that the inner bent 43 and the lower margin 45 of the unexposed surface portion 47 of the roof member 31 are partly cut away to provide the cut-out 79 such that, in use, a lower edge of the cut-off 79 is spaced from the bottom 38 of the side outer member 32 toward the center axis of the vehicle by d as shown; and that the inner bent 44 and the lower margin 46 of the unexposed surface portion 48 of the side outer member 32 are extended to provide an extension 80 spaced at its extended edge from the bottom 38 toward the center axis of the vehicle by e as shown, which in use is combined with the cut-out 79 of the roof member 31 to be placed outwardly on and coupled to the portion 47 of the member 31 for example by spot welding. Furthermore, no putty sealer or the like is needed to apply since there is no gap between the unexposed surface portions 47 and 48 of the members 31 and 32.

Coupling strength of the members 31 and 32 is improved since coupling together by for example spot welding can be made between the inner bents 43 and 44 and the lower margins 45 and 46 of the members 31 and 32 with the inner bent 43 and the lower margin 45 of the roof member 31 being inside.

Thus, the roof member 31 can be placed onto the side outer member 32 from right above without causing any gap between the unexposed surface portions 47 and 48 of the members 31 and 32. No putty sealer or the like is needed; intrusion of any rainwater is reliably prevented; and external appearance is also improved.

Besides the above features, the third embodiment has substantially the same arrangement as that of the other embodiments and the same functions and effects can be obtained.

It is to be understood that the present invention is not limited to the above embodiments and that various changes and modifications may be made without departing from the spirit and the scope of the present invention.

What is claimed is:

1. A roof structure for a vehicle which comprises a side outer member having a side portion and a roof member having a side portion, where said side portions are combined to provide a groove extending over at least one half of a distance formed along a boundary between said members, said groove being defined by overlapped portions of said members, the side outer member having exposed and unexposed surface portions the roof member having exposed and unexposed surface portions, the side portion of the roof member being diagonally cut out to provide a diagonally cut portion downwardly directed toward A center axis of the roof member such that a corner defined by the cut portion and exposed and unexposed surface portions of the roof member are substantially aligned with a corner defined by the exposed and unexposed surface portions of the side outer member, said unexposed surface portions of said members having abutments which do not overlap each other.

* * * * *

UNITED STATES PATENT AND TRADEMARK OFFICE
CERTIFICATE OF CORRECTION

PATENT NO. : 5,897,159
DATED : April 27, 1999
INVENTOR(S) : Osamu NAGASAWA

It is certified that error appears in the above-identified patent and that said Letters Patent is hereby corrected as shown below:

On the title page, item [75] should be:

--Osamu Nagasawa, Hino, Japan--

On the title page, item [73] should be:

--[73] Assignee: Hino Jidosha Kogyo Kabushiki Kaisha, Tokyo, Japan--

Signed and Sealed this

Twenty-third Day of May, 2000

Attest:

Q. TODD DICKINSON

Attesting Officer

Director of Patents and Trademarks